United States Patent [19]

Kelly

[11] 4,173,612

[45] Nov. 6, 1979

[54] EXTRUSION PROCESS FOR THERMOPLASTIC RUBBER FILM

[75] Inventor: William G. F. Kelly, Cornelia, Ga.

[73] Assignee: Johnson & Johnson, New Brunswick, N.J.

[21] Appl. No.: 848,439

[22] Filed: Nov. 3, 1977

[51] Int. Cl.$^2$ .............................................. B28B 3/20
[52] U.S. Cl. ................................. 264/176 R; 264/211
[58] Field of Search ............... 260/889, 878 R, 876 B; 264/22, 176 R, 210 R

[56] References Cited

U.S. PATENT DOCUMENTS

| | | | |
|---|---|---|---|
| 3,407,253 | 10/1968 | Yoshimura et al. | 260/889 |
| 3,456,038 | 7/1969 | Newman et al. | 260/889 |
| 3,536,653 | 10/1970 | Bickel et al. | 260/889 |
| 3,758,661 | 9/1973 | Yamamoto et al. | 260/889 |
| 3,950,281 | 4/1976 | Usamoto et al. | 260/889 |
| 3,974,240 | 8/1976 | Bock et al. | 260/889 |
| 4,005,054 | 1/1977 | Bonnefon | 264/22 |
| 4,076,669 | 2/1978 | Harper | 260/889 |

OTHER PUBLICATIONS

"Structure and Properties of Block Polymers and Multiphase Polymer System", by S. L. Aggarwal, Polymer, (17), pp. 938–956, Nov. 1976.
"Solprene Thermoplastic Rubber as a Modifier to DE, PS, and PP".
"Modification of PE and PP with Solprene Thermoplastic Rubber".

*Primary Examiner*—Jay H. Woo
*Attorney, Agent, or Firm*—Charles J. Metz

[57] ABSTRACT

Thermoplastic rubber containing minor amounts of amorphous polypropylene is extruded into films. The films retain characteristic elastomeric properties of pure rubber, but are significantly more processable owing to the presence of the amorphous polypropylene.

5 Claims, No Drawings

EXTRUSION PROCESS FOR THERMOPLASTIC RUBBER FILM

The invention relates to thermoplastic rubber film having improved processing characteristics.

BACKGROUND OF THE INVENTION

Thermoplastic rubber is a relatively new type of polymeric composition that has become commercially available within the past decade or so. These polymers have the useful property of behaving like rubber at normal use temperatures, without the need for vulcanization. And because they are not vulcanized, they can be processed by many of the normal thermoplastic resin procedures at elevated temperatures.

One serious problem has been encountered, however, in attempts to extrude film from thermoplastic rubber. Either because of too low melt strength, or excessive notch sensitivity, or both, pure thermoplastic rubber does not draw well when extruded into thin films. The preferred way to extrude films from thermoplastic polymers is to extrude through a die having a gap of a given thickness, and to draw the extruded web at a rate of speed faster than the rate at which the molten material is ejected from the die. This causes a reduction in thickness. Typically, this reduction in thickness will be as much as threefold or even more.

I have found, however, that when one attempts to extrude a film from pure thermoplastic rubber, the web cannot be drawn down at all. In fact, in many cases the web must be drawn at a rate of speed slower than the extrusion rate, to thereby produce a film having a thickness or gauge greater than the die gap. This is undesirable because the throughput rate is made slow, and because gauge variations are magnified. And further, I have not been very successful in producing any films at all of pure thermoplastic rubber at thicknesses much less than about 10 mils because of an excessive tendency of the extruded webs to tear.

Another problem with extruding thermoplastic rubber is the extremely high melt viscosity. This causes very high pressure at the die and uneconomically low throughput rates. While the addition of many types of thermoplastic polymers to thermoplastic rubbers is known, and such addition will significantly reduce the melt viscosity in many cases, it often happens that when enough of the other polymer has been added to improve the processability, the product, while useful for many purposes, has lost much of the rubbery or elastomeric properties of the thermoplastic rubber.

SUMMARY OF THE INVENTION

It has been discovered that when minor amounts of amorphous polypropylene are added to thermoplastic rubber, the resulting mixture has substantially improved processing characteristics such that it can readily be extruded into films. Surprisingly, the resulting films retain characteristic properties of rubber, despite the addition of as much as about 30 weight percent or more of the amorphous polypropylene.

THE PRIOR ART

It is known to add thermoplastic resins in varying proportions to thermoplastic rubbers. It has been suggested to blend "polypropylene" (meaning isotactic or crystalline polypropylene) with thermoplastic rubber. However, as was mentioned above, the addition of many thermoplastic polymers to thermoplastic rubber substantially alters the characteristic rubber properties of the mixture even at quite low proportions of thermoplastic polymer.

DETAILED DESCRIPTION OF THE INVENTION

The sheet material of the invention contains thermoplastic rubber and amorphous polypropylene. The thermoplastic rubbers contemplated for use in the invention are known materials. They are block copolymers having blocks of polybutadiene or polyisoprene, and blocks of polystyrene. A review article discussing these materials is "Structure And Properties Of Block Polymers And Multi-phase Polymer Systems: An overview Of Present Status And Future Potential", by S. L. Aggarwal, *Polymer*, Vol. 17, November 1976, pages 938-956. Two representative types of thermoplastic rubbers are the linear block copolymers (A-B-A) having a mid-block of polybutadiene or polyisoprene and end-blocks of polystyrene, and the "star" or "radial" block copolymers having from 4 to 29 "arms" connected to a common center. Each arm is an A-B block copolymer, the inner portion being polybutadiene or polyisoprene, with the outer portion being polystyrene.

The typical thermoplastic rubber contains discrete polystyrene domains in a rubbery matrix. Apparently, the polystyrene domains act in a manner analogous to conventional chemical crosslinks. The resulting rubber acts as though it has been vulcanized, even though no chemical crosslinks are present.

When the thermoplastic rubber is heated to about 200° F., the polystyrene domains begin to soften, and at temperatures of the order of 300° F. to 400° F., the thermoplastic rubbers can be melt processed by mechanical working in a manner analogous to conventional thermoplastic compositions. Upon cooling, the discrete polystyrene domains are reformed, and the material again exhibits rubbery elastomeric properties.

While thermoplastic rubbers can be processed in ways analogous to those used for conventional thermoplastic polymers, for the reasons discussed above, it has been found to be impracticably difficult to extrude pure thermoplastic rubber into thin films.

The material that is used to improve the processability of thermoplastic rubber, while still retaining the characteristic rubbery properties of the rubber, is amorphous polypropylene. Amorphous polypropylene is a known material. It is essentially atactic polypropylene having an isotactic content of not more than about 20 weight percent, and preferably not more than about 10 weight percent.

The amorphous polypropylene is employed in an amount sufficient to improve the processability of the thermoplastic rubber when extruding thin films. Such improvement is evidenced by the ability to draw down extruded webs of the rubber/amorphous polypropylene mixture to thereby produce films having thicknesses less than the die gap. Further, the pressure in the extruder and die is greatly reduced, which permits more economical operation. The exact minimum amount of amorphous polypropylene which must be employed in order to begin to obtain the advantages of the invention varies somewhat from case to case, but it is usually of the order of about 10 weight percent, based on weight of rubber plus amorphous polypropylene. The upper limit of polypropylene will also vary from case to case, depending on the nature of the ingredients and the use intended for the product. At proportions above about 35 weight percent (on the same basis), a significant reduction in the characteristic rubbery elastomeric properties of the product begins to occur. This may be acceptable for some uses, and not for others. Thus, the upper limit of amorphous polypropylene would be that point at which the product still retains significant rubbery elastomeric characteristics.

Other conventional materials, employed in the usual amounts, can be employed in the mixture for their known purposes. Such materials include pigments, anti-blocking agents, stabilizers, anti-oxidants, ultraviolet stabilizers, and the like.

The film of the invention is produced by extruding a mixture of the amorphous polypropylene and thermoplastic rubber into a thin film. Conventional extrusion apparatus can be employed. Melt temperatures will usually be within the range of from about 275° to about 400° F., and preferably from about 325° to about 375° F. Because of the radically different melting points and melt viscosities of the two materials, thorough mixing is more difficult than the usual case of mixing two different thermoplastic polymers. In some cases it has been found that mixing is enhanced by cooling the extruding screw. Extruder screws that are specifically designed for effective mixing are available, and may be preferred for efficient commercial operation.

In order to reduce blocking of the film product, processing at the lowest possible temperature is recommended because this results in a film having a matte, rather than glossy, surface. Film having a matte surface has a reduced tendency to block.

The process of the invention can be used to produce free films, and it can be used to produce coatings of the rubber/amorphous polypropylene mixture on a substrate. As a general rule, the films of the invention will have thicknesses of the order of about 10 mils or less. The films are useful as stretch tape on disposable diapers, and for other uses that stretch films can be used for.

The following examples illustrate the invention:

CONTROL EXAMPLE 1

It was attempted to extrude 2-inch wide films 4 mils thick from "Solprene P414" and "Solprene P418" thermoplastic rubbers. Solprene P414 was a 60/40 butadiene/styrene radial block copolymer, and Solprene P418 was an 85/15 isoprene/styrene radial block copolymer. These materials are further characterized as follows:

|  | Solprene P414 | Solprene P418 |
|---|---|---|
| Molecular weight | 150,000 | 300,000 |
| Specific gravity | 0.95 | 0.92 |
| Melt flow, 5 kg at 200° C. | 2.2 | 2.2 |
| Inherent viscosity | 0.80 | 1.16 |
| Solution viscosity, cps. |  |  |
| 20% wt in toluene | 230 | 900 |
| 25% wt in toluene | — | 2300 |
| Physical Properties - |  |  |
| Compression Molded 2 Minutes At 300° F. |  |  |
| 100% modulus, psi | 600 | 140 |
| Tensile at break, psi | 4000 | 1400 |
| Elongation, % | 750 | 1050 |
| Shore A Hardness | 90 | 34 |

The extruder employed was a standard 1-inch Killion extruder having a length to screw diameter ratio (L:D) of 24:1. The screw was a compression screw. The die was 2 inches wide with a 2-mil gap. The process variables recorded were screw RPM, feed temperature (first zone in barrel), meter temperature (end of barrel), adapter temperature (the block connecting the barrel with the die), bath temperature (the cooling water bath into which the film was extruded), air gap (distance between die and water bath), pressure (in the barrel at the end of the screw), and pull roll speed (the film windup).

The extrusion conditions in this experiment were the following:

|  | Solprene P418 | Solprene P414 |
|---|---|---|
| RPM | 43 | 43 |
| Feed temp., °F. | 300 | 300 |
| Meter temp., °F. | 350 | 350 |
| Adapter temp., °F. | 325 | 325 |
| Die temp., °F. | 325 | 325 |
| Bath temp., °F., and Gap, inches | 55°, ½" | 55°, ½" |
| Pull Roll Speed, feet/minute | 4 | 4 |
| Pressure, psi | 2300 | 2300 |

Neither sample would draw down and both blocked badly. It was not possible to produce a film having a thickness less than about 10 mils without the web tearing. Thus, the maximum draw ratio (die gap/film thickness) was about 0.2.

EXAMPLE 1

By a procedure analogous to that described in Control Example 1, using the same extruder, 2-inch wide film strips about 4 mils thick were made from the following formulation:

|  | Parts, by weight |
|---|---|
| Solprene P418 | 89 |
| AFAX 900-C-P | 10 |
| Kemamide E | 1 |

"Kemamide E" is a fatty acid amide, and is used as an anti-blocking agent.

"AFAX 900-C-P" is an amorphous polypropylene having the following properties:

|  | Typical Value, AFAX 900-C-P | Test Method |
|---|---|---|
| Viscosity, cps. |  |  |
| at 350° F. (177° C.) | 5500 | Brookfield Thermosel |
| at 375° F. (191° C.) | 4000 | Brookfield Thermosel |
| Needle penetrations, mm/10 | 16 | ASTM D 1321-65 |
| Ring-and-ball softening point, °F. (°C.) | 310(154) | ASTM D 2398-68 |
| Density, lbs/gal (kg/liter) |  |  |
| at 75° F. (24° C.) | 7.2(0.86) |  |
| at 375° F. (191° C.) | 6.1(0.73) |  |
| Normal Application temperature: °F. (°C.) | 350–375 (177–191) |  |
| Flash Point, °F. (°C.) | 500(260) | ASTM D 92 |
| Ash content, ppm | 10 | Hercules P-67-3 |
| Glass Transition temperature, °F. (°C.) | −6(−21) | duPont 990 thermal analyzer |
| Heat of fusion, Btu/lb, (cal/gm) | 13.5(7.4) | duPont 990 thermal analyzer |
| Heat capacity, Btu/lb/°F. | 0.66 | Perkin-Elmer DSC-2 |

The extrusion conditions were the following:

| | |
|---|---|
| Die gap, mils | 5 |
| RPM | 46 |
| Feed temp., °F. | 300 |
| Meter temp., °F. | 400 |
| Adapter temp., °F. | 350 |
| Die temp., °F. | 350 |
| Pressure, psig | 1250 |
| Bath temp., °F., Gap, inches | 70°, ½" |
| Pull Roll Speed, feet/minute | 45 |

The film samples were good, although moderately tacky. There were no holes in the film.

EXAMPLE 2

By a procedure analogous to that described in Control Example 1, using the same extruder, 2-inch wide films were extruded from the following formulations:

| | Parts, by weight | |
|---|---|---|
| Component | A | B |
| Solprene P418 | 88 | 87 |
| AFAX 900-C-P | 10 | 10 |
| Calcium Stearate | 1 | 2 |
| Kemamide E | 1 | 1 |

The extrusion conditions were the following:

| Condition | A | B |
|---|---|---|
| Die gap, mils | 5 | 5 |
| RPM | 53 | 53 |
| Feed temp., °F. | 300 | 300 |
| Meter temp., °F. | 400 | 400 |
| Adapter temp., °F. | 350 | 350 |
| Die temp., °F. | 350 | 350 |
| Barrel Pressure, psig | 1250–2000 | 1500–2250 |
| Pull Roll Speed, Feet/minute | 46 | 49 |
| Bath temp., °F./Gap, inches | RT, ½ | RT, ½ |

("RT" refers to "room temperature")

The films processed well. They were tested, and were found to have the following properties:

| Property | A | B |
|---|---|---|
| Tensile strength, psi | | |
| at 100% elongation | 83 | 86 |
| at 300% elongation | 133 | 128 |
| at break | 1200 | 1142 |
| Elongation, % | 1847 | 1680 |
| Thickness, mils | 6 | 7 |

The manufacturer reports that the pure rubber has the following properties on compression molded plaques:

| | |
|---|---|
| Tensile strength, psi | |
| at 100% elongation | 140 |
| at break | 1400 |
| Elongation, % | 1050 |

EXAMPLE 3

For this experiment, a different extruder was used. It was a 2-inch, 24:1 (L:D) Killion extruder with a rapid transition screw. The die was 6-inches wide, and a 5-mil die gap was used. An additional variable recorded was the transition temperature (taken in the middle of the barrel).

The formulation was the following:

| | Parts, by weight |
|---|---|
| Solprene p418 | 78.5 |
| AFAX 900-C-P | 20 |
| Kemamide E | 1.5 |

The extruder conditions were as follows:

| | |
|---|---|
| Screw RPM | 25 |
| Feed temp., °F. | 350 |
| Trans. temp., °F. | 375 |
| Meter temp., °F. | 400 |
| Adapter temp., °F. | 375 |
| Die temp., °F. | 400 |
| Bath temp., °F./Gap, inches | 70°, 2" |
| Pull Roll Speed, feet/min. | 18 |

The film processed well. It was evaluated for the following properties:

| | Parts, by weight |
|---|---|
| Power pull, psi at 100% elongation | 97.7 |
| Power pull after 10 cycles | 88.8 |
| Thickness, mils | 4.5 |

"Power pull" is a test employed to evaluate the rubbery characteristics of the material tested. A 1-inch wide strip is tested in an Instron tester for tensile strength by stretching to 100% elongation at a rate of 20 inches/minute, and recording the 100% tensile strength. The film is then relaxed, and the test is repeated for a total of 10 cycles. The 100% elongation tensile strength is recorded after the 10th cycle. An ideal or perfect rubber would have no change in tensile strength after the 10th cycle.

EXAMPLE 4

By a procedure analogous to that described in Example 3, using the same extruder, film was extruded from the following formulation:

| | Parts, by weight |
|---|---|
| Solprene P418 | 69.5 |
| AFAX 900-C-P | 30 |
| Kemamide E | 0.5 |

The extruder conditions were as follows, for two different runs:

| | A | B |
|---|---|---|
| Die gap, mils | 5 | 5 |
| Screw RPM | 40 | 40 |
| Feed temp., °F. | 325 | 300 |
| Trans. temp., °F. | 375 | 350 |
| Meter temp., °F. | 400 | 350 |
| Adapter temp., °F. | 400 | 400 |
| Die temp., °F. | 400 | 400 |
| Pressure, psig | 100 | 200 |
| Pull Roll Speed | 12.5 | 12.5 |
| Air gap, inches | ½ | ½ |
| Water temp. | RT | RT |

The film processed very well. In this extruder, it was found desirable to turn on cooling water to the extruder screw in order to attain satisfactory mixing of the ingredients. The properties of the films were the following:

|  | A | B |
|---|---|---|
| Power pull, psi at 100% elong. | 105 | 104 |
| Power pull after 10 cycles | 89 | 91 |
| Tensile strength, psi | 872 | |
| Elongation, % | 1433 | |
| Thickness, mils | 5.5 | 5.3 |

EXAMPLE 5

In this experiment, the procedure of the preceding Examples was used, except that the extruder was a 2½ inch Egan having an L:D ratio of 24:1 and a die 24 inches wide gapped to 15 mils. The formulation employed was the following:

|  | Parts, by weight |
|---|---|
| Solprene P418 | 69.25 |
| AFAX 900-C-P | 30.00 |
| Kemamide E | 0.75 |

The process variables recorded were similar to those of the earlier Example. Zones 1–4 were in the extruder barrel (zone 1—the feed end; zone 4—at end of screw), the three zones in the die were located at the two sides and the middle, and the temperature of cooling water to the screw was recorded. The process variables over a several hour run were as follows:

| Temperatures, °F. | |
|---|---|
| Zone 1 | 320–330 |
| Zone 2 | 350–370 |
| Zone 3 | 365–375 |
| Zone 4 | 400–430 |
| Adaptor | 383–400 |
| Die 1 | 415–420 |
| Die 2 | 390–420 |
| Die 3 | 390–412 |
| Melt temperature, °F. | 375–395 |
| Screw cooling water, °F. | 78–92 |
| Quench water, °F. | 90–110 |
| Screw RPM | 90 |
| Barrel Pressure, psi | 2200–3500 |
| Pull Roll Speed, ft/min | 11–17 |
| Air Gap, inches | 1–¼ |
| Width of web, inches | 20–½ ± ¼ |
| Film thickness, mils | 5.12 ± 1.8 |

Typical properties of the film of this Example were as follows:

|  |  |
|---|---|
| Power pull, 100% psi | 113 |
| Power pull, after 10 cycles, psi | 101 |
| Ultimate tensile, psi | 1170 |
| Elongation at break, % | 2400 |

EXAMPLE 6 AND CONTROL EXAMPLE 2

Using the 2-inch Killion extruder and procedure described in Example 3, films were made from the following two formulations:

|  | Parts, by weight | |
|---|---|---|
|  | Example 6 | Control 2 |
| Solprene P418 | 89 | 89 |
| AFAX 900-C-P | 10 | — |
| Profax 6523[1] | — | 10 |
| Kemamide E | 1 | 1 |

[1] Isotactic polypropylene having a degree of tacticity of about 96 percent.

The extrusion conditions were the following:

|  | Example 6 | Control 2 |
|---|---|---|
| Die Gap, mils | 5 | 5 |
| Feed temp., °F. | 325 | 325 |
| Metering temp., °F. | 360 | 360 |
| Adapter temp., °F. | 370 | 370 |
| Die temp., °F. | 380 | 380 |
| Bath temp., °F. | 70 | 70 |
| Head Pressure, psig | 1000 | 2500 |
| Screw RPM | 30 | 25 |

The film of Example 6 was non-tacky but could be drawn only to a minimum of 8 mils. The film of Control 2 was extremely tacky (and could not be unwound), but could be drawn down to 5 mils.

Physical properties tested on these materials were as follows:

|  | Example 6 | Control 2 |
|---|---|---|
| Power pull, 100%, psi | 110 | 480 |
| Power pull, after 10 cycles, psi | 100 | 440 |
| % elastic recovery after 100% elongation | 95 | 87 |

The decreased elastic recovery in the sample containing isotactic polypropylene is considered to be an indication of significant loss of the rubbery elastic properties of the thermoplastic rubber.

What is claimed is:

1. In a process for producing thermoplastic rubber film by extruding thermoplastic rubber into a thin film, the improvement which comprises employing as the thermoplastic rubber a mixture of thermoplastic rubber and sufficient amorphous polypropylene to improve the processability of said thermoplastic rubber as evidenced by the ability to achieve a draw ratio while extruding said mixture of at least 1.

2. The process of claim 1 wherein said thermoplastic rubber is a radial block copolymer of styrene with isoprene or butadiene.

3. The process of claim 2 wherein the amorphous polypropylene contains less than about 20 weight percent isotactic polypropylene.

4. The process of claim 2 wherein the amorphous polypropylene contains less than about 10 weight percent isotactic polypropylene.

5. The process of claim 2 wherein the amorphous polypropylene is employed in an amount within the range of from about 10 to about 35 weight percent, based on weight of thermoplastic rubber plus amorphous polypropylene.

* * * * *

UNITED STATES PATENT AND TRADEMARK OFFICE
CERTIFICATE OF CORRECTION

PATENT NO. : 4,173,612
DATED : November 6, 1979
INVENTOR(S) : William George Francis Kelly It is certified that error appears in the above-identified patent and that said Letters Patent are hereby corrected as shown below:

In Column 5, line 8, "70°,"" should read -- 70°,3/4" --.

In Column 5, line 38, "RT,   RT," should read -- RT,3/4   RT,3/4 --

*Signed and Sealed this*

*Fifth* Day of *February 1980*

[SEAL]

Attest:

SIDNEY A. DIAMOND

*Attesting Officer*      *Commissioner of Patents and Trademarks*